US012417198B2

(12) United States Patent
Benisty et al.

(10) Patent No.: US 12,417,198 B2
(45) Date of Patent: Sep. 16, 2025

(54) BURST AWARENESS SCHEDULER OVER HOST INTERFACE

(71) Applicant: SANDISK TECHNOLOGIES, INC., Milpitas, CA (US)

(72) Inventors: Shay Benisty, Beer Sheva (IL); Amir Segev, Meiter (IL)

(73) Assignee: Sandisk Technologies, Inc., Milpitas, CA (US)

( * ) Notice: Subject to any disclaimer, the term of this patent is extended or adjusted under 35 U.S.C. 154(b) by 190 days.

(21) Appl. No.: 18/502,694

(22) Filed: Nov. 6, 2023

(65) Prior Publication Data
US 2025/0147909 A1    May 8, 2025

(51) Int. Cl.
*G06F 13/28* (2006.01)
*G06F 13/10* (2006.01)
*G06F 13/24* (2006.01)

(52) U.S. Cl.
CPC ............ *G06F 13/28* (2013.01); *G06F 13/102* (2013.01); *G06F 13/24* (2013.01)

(58) Field of Classification Search
None
See application file for complete search history.

(56) References Cited

U.S. PATENT DOCUMENTS

| 11,386,022 | B2 | 7/2022 | Deglin et al. |
| 11,537,524 | B2 | 12/2022 | Segev et al. |
| 2021/0036806 | A1* | 2/2021 | Lee .................. H04L 1/1685 |
| 2022/0317928 | A1 | 10/2022 | Shen et al. |
| 2023/0105936 | A1 | 4/2023 | Benisty et al. |
| 2023/0128954 | A1 | 4/2023 | Benisty |

* cited by examiner

*Primary Examiner* — Scott C Sun
(74) *Attorney, Agent, or Firm* — Patterson + Sheridan, LLP (57) ABSTRACT

Instead of an arbitration over the link not considering bursts, a smart scheduler in a solid state drive (SSD) host interface is burst aware. The scheduler considers the type of transactions that are going to be sent over the interface. The scheduler sends the transactions in the most efficient way while maximizing the efficiency over the host DRAM. The schedulers may be calibrated from time to time on-the-fly to find the optimal configurations adapted to the current workload. The scheduler will organize the packets selected by the arbitration module so that the data transfers are sent in a burst of a predetermined sized to the host for optimum performance. For further optimization other packet types are sent in bursts as well.

20 Claims, 10 Drawing Sheets

BURST AWARENESS SCHEDULER OVER HOST INTERFACE

BACKGROUND OF THE DISCLOSURE

Field of the Disclosure

Embodiments of the present disclosure generally relate to improving Peripheral Component Interconnect express (PCIe) transfer scheduling.

Description of the Related Art

Non-Volatile Memory express (NVMe) is based on a paired submission queue (SQ) and completion queue (CQ) mechanism. Commands are placed by the host software into a SQ. Completions are placed into the associated CQ by the controller. In general, SQs and CQs are allocated in the host memory.

Working with NVMe over Peripheral Component Interconnect express (PCIe), exposes solid state drives (SSD) to bad utilization of the physical PCIe bus. This results in some performance degradation. Each transaction layer packet (TLP) of data that is transferred over the PCIe bus has about 24 bytes of overhead. With a typical payload size (limited by the host) of 256 bytes, that is about 10%.

There is a need in the art for improved PCIe transfer scheduling.

SUMMARY OF THE DISCLOSURE

Instead of an arbitration over the link not considering bursts, a smart scheduler in a solid state drive (SSD) host interface is burst aware. The scheduler considers the type of transactions that are going to be sent over the interface. The scheduler sends the transactions in the most efficient way while maximizing the efficiency over the host DRAM. The schedulers may be calibrated from time to time on-the-fly to find the optimal configurations adapted to the current workload. The scheduler will organize the packets selected by the arbitration module so that the data transfers are sent in a burst of a predetermined sized to the host for optimum performance. For further optimization other packet types are sent in bursts as well.

In one embodiment, a data storage device comprises: a memory device; and a controller coupled to the memory device, wherein the controller is configured to: determine a number of transaction layer packets (TLPs) that equal a burst; arrange the number of TLPs one after another to form the burst, wherein the number of TLPs are a same transaction type; and send the burst to a host device.

In another embodiment, a data storage device comprises: a memory device; and a controller coupled to the memory device, wherein the controller is configured to: receive a plurality of transaction layer packets (TLPs) at a host interface module (HIM), wherein the plurality of TLPs comprise one of more transaction types selected from the group consisting of: command fetching, host pointer fetching, host memory buffer (HMB) access, command completion posting, interrupt posting, and data transfer; arbitrate the plurality of TLPs; and send a burst of TLPs to a host device, wherein the burst comprises a plurality of TLPs of a first size and of a same transaction type.

In another embodiment, a data storage device comprises: means to store data; and a controller coupled to the means to store data, wherein the controller is configured to: configure an arbitration burst setting in an arbiter; operate the arbiter according to the arbitration burst setting; measure performance of the arbiter using the arbitration burst setting; adapt the arbitration burst setting to a new arbitration burst setting; and repeat the configuring, operating, and measuring using the new arbitration burst setting instead of the arbitration burst setting.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of an arbitration over the link not considering bursts, a smart scheduler in a solid state drive (SSD) host interface is burst aware. The scheduler considers the type of transactions that are going to be sent over the interface. The scheduler sends the transactions in the most efficient way while maximizing the efficiency over the host DRAM. The schedulers may be calibrated from time to time on-the-fly to find the optimal configurations adapted to the current workload. The scheduler will organize the packets selected by the arbitration module so that the data transfers are sent in a burst of a predetermined sized to the host for optimum performance. For further optimization other packet types are sent in bursts as well.

Figure 1:
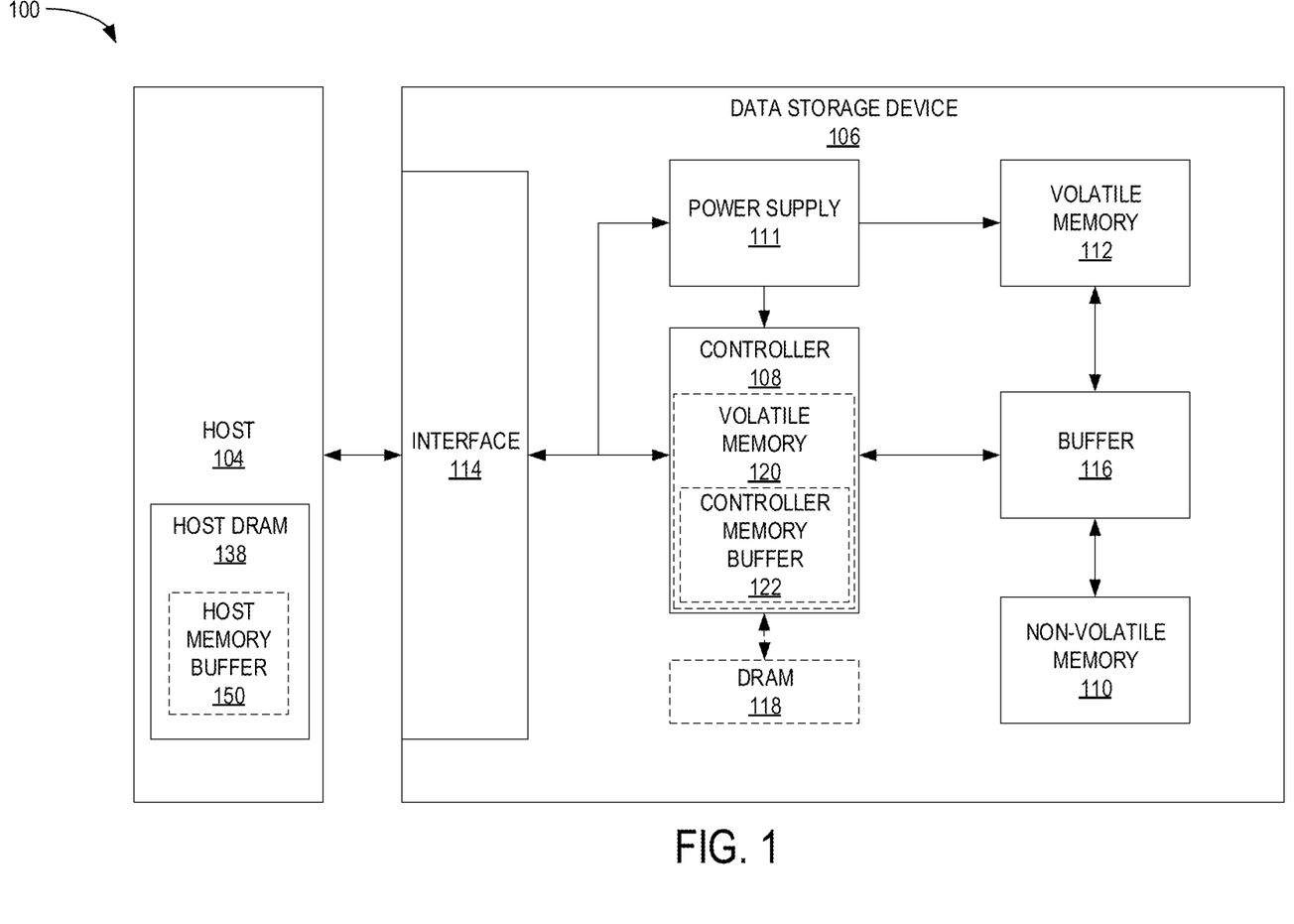
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
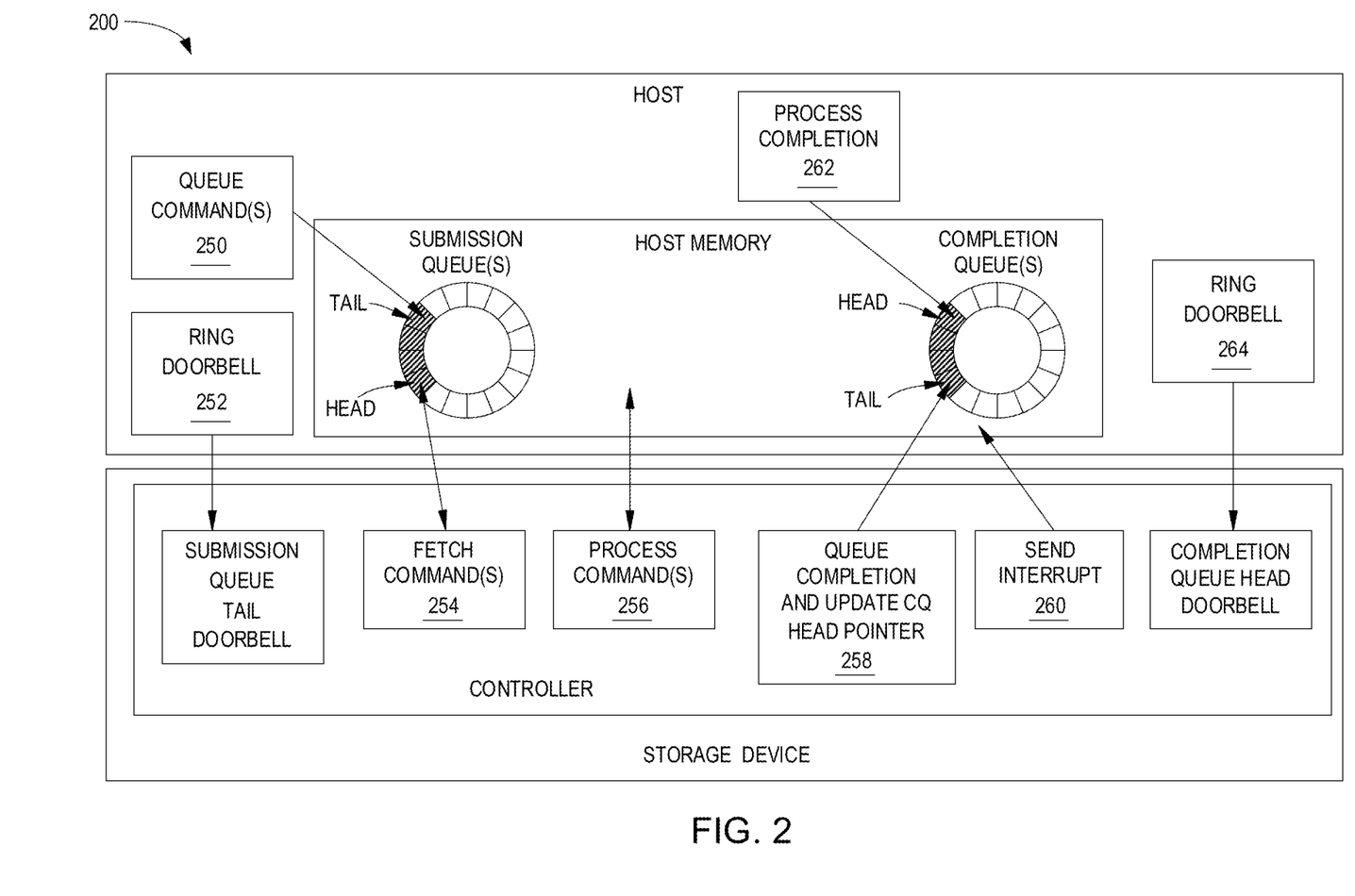
FIG. 2 is a block diagram illustrating a method of operating a SSD to execute a read, write, or compare command, according to one embodiment.

FIG. 2 is a block diagram illustrating a method 200 of operating a SSD to execute a read, write, or compare command, according to one embodiment. The method 200 may be used with the storage system 100 having a host device 104 and a data storage device 106 comprising a controller 108.

The method 200 begins at operation 250, where the host device writes a command into a submission queue as an entry. The host device may write one or more commands into the submission queue at operation 250. The commands may be read commands or write commands or compare commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queues, and the controller receives or DMA reads the command.

In operation 256, the controller processes the command and writes, transfers data associated with a read command to the host device memory, or retrieves data for a compare command. The controller may process more than one command at a time. The controller may process one or more commands in the submission order or in the sequential order. Processing a write command may comprise identifying a stream to write the data associated with the command to and writing the data to one or more logical block address (LBA) of the stream.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
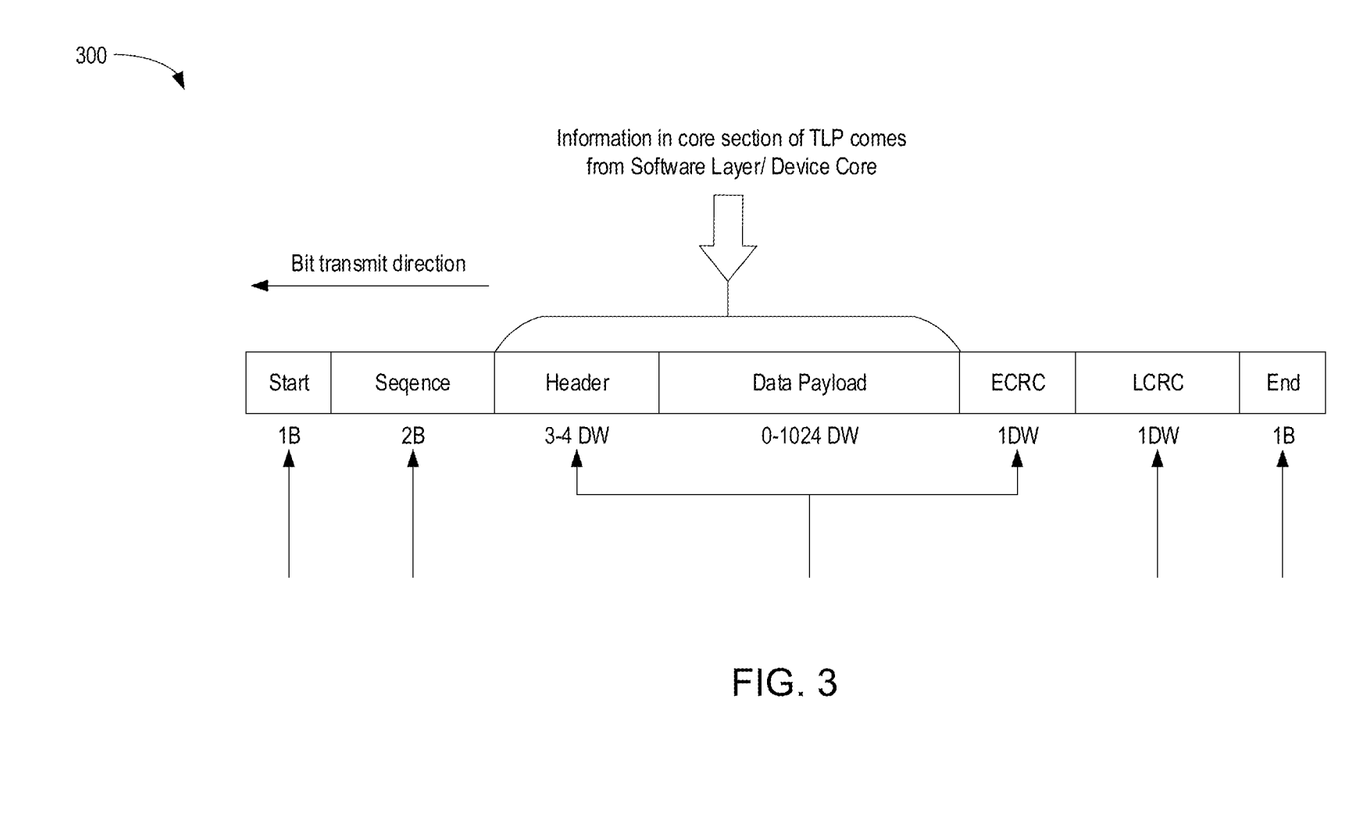
FIG. 3 is a schematic diagram illustrating a system for PCIe TLP packets, according to certain embodiments.

FIG. 3 is a schematic diagram illustrating a system 300 for PCIe TLP packets, according to certain embodiments. The data payload is the information that needs to pass between host and device and is limited to 4k (although typical use is 256 bytes). The transaction layer adds the header and ECRC. The Link layer adds the sequence number and LCRC. Finally, the physical layers adds the start byte and the end byte. Overall, for every data payload, there is about 6 more Dwords.

NVMe commands work in logical block address (LBA) granularity, where LBAs can be of a different size 512/4k/8k/16k bytes+0/8/16/72 bytes. The size is constant per command, but can differ between the different commands. However, the number of PCIe packets that generates this transfer granularity (e.g. 4 KB) is usually more than a single packet. This is due to the PCIe max read request size and max payload size parameters defined by a PCIe standard. The values of the parameters are usually 128-bytes, 256-bytes, or 512-bytes. At least 8 PCIe TLPs are needed to transfer 4 KB of data when max payload size is 512-bytes.

From the PCIe point of view, usually a command is split over several TLPs because there is a parameter associated with the PCIe standard that defines the maximum payload size. Usually the system 300 works in a maximum payload size of 512-byte, so from an NVMe point of view the packets should be transferred in 4k bytes. From a PCIe point of view the original command should be split into 8 TLPs because the size of each packet is 512-bytes. The transfer can be more than 8 TLPs.

The NVMe standard defines that the data storage device is the master over the PCIe bus. The data storage device interacts mainly with the host DRAM using PCIe memory read and write transactions. Note that PCIe is a full duplex bus allowing simultaneous read and write transfers. The NVMe device performs the following read transactions types over the bus: command fetching with the size of each command being 64 bytes for example; host buffer pointer fetching with the size of each pointer being 8 bytes for PRP and 16 bytes for SGL, HMB read accesses where the size and granularity depend on the implementation, and read data transfers where the granularity is 4 KB for example using multiple TLPs with a burst size of 4 KB. The NVMe device performs the following write transaction types over the bus: command completion posting where the size of each command completion entry is 16 bytes for example, interrupt posting where the size if 4 bytes but is directed to the CPU and not to host DRAM, HMB write accesses where the size and granularity depend on the implementation, and write data transfers where the granularity is 4 KB for example using multiple TLPs with a burst size of 4 KB. Previously, the arbitration over the link did not consider bursts. On the PCIe interface, all transfer types were interleaved while cutting the bursts in the middle.

Figure 4:
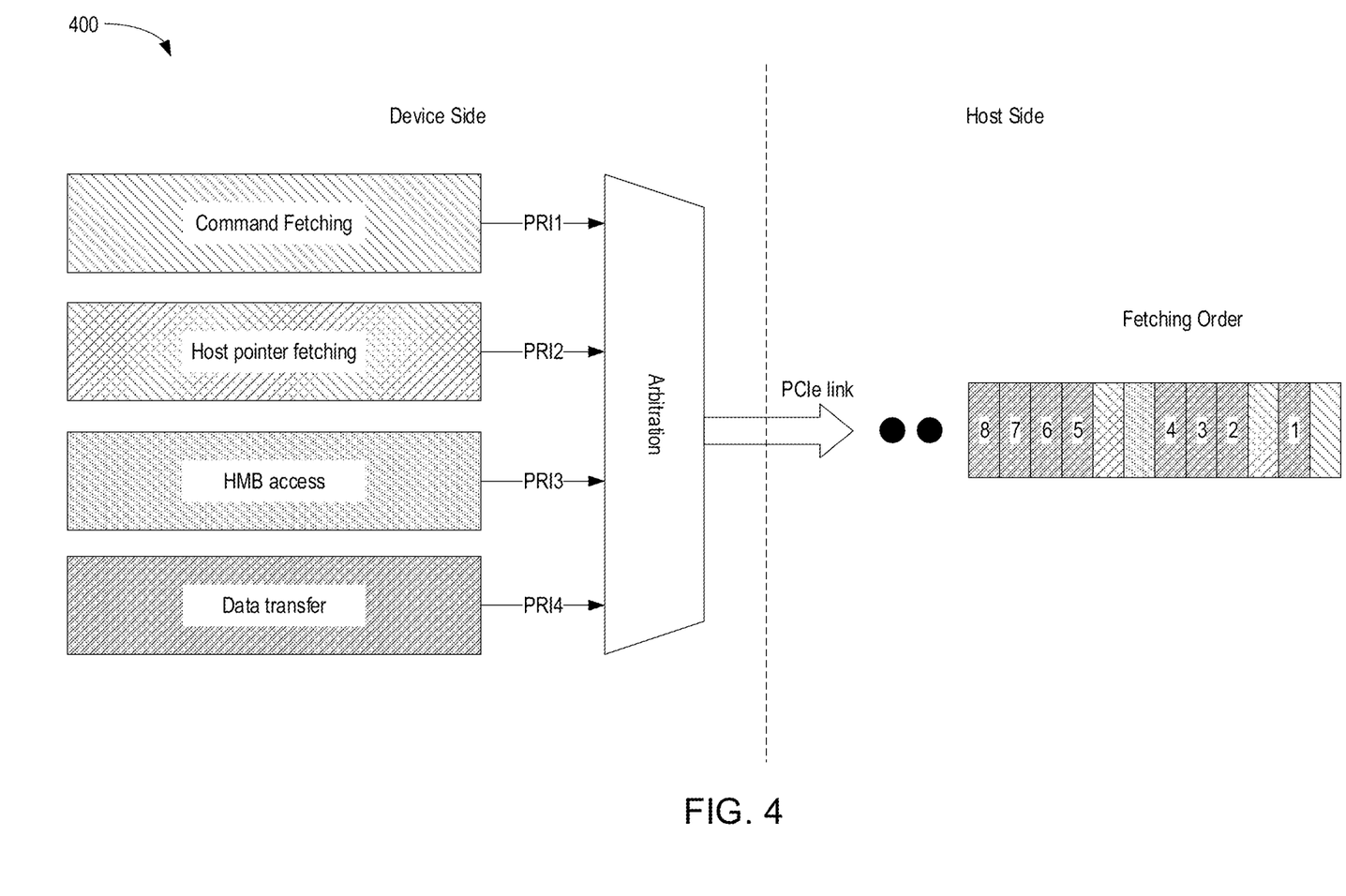
FIG. 4 is a schematic diagram illustrating a system for PCIe memory read transfer ordering, according to certain embodiments.

FIG. 4 is a schematic diagram illustrating a system 400 for PCIe memory read transfer ordering, according to certain embodiments. In the system 400 there are 8 TLPs in the data-transfer that create one burst. The command fetching, the host pointer fetching, and the HMB read access are interleaved within the burst. This behavior is allowed over PCIe interface, but is not ideal over the host DRAM interface. All the TLPs are targeted to host DRAM.

The system 400 comprises a device side and a host side. The host side comprises the 8 TLPs in the fetching order. On the device side there is an arbitration module that communicates with the host side through a PCIe link. The arbitration module selects which operation of packets to send to the host. The selected data packets are shown on the host side in the fetching order. The command fetching communicates with the arbitration module through the PRI1. The command fetching has to access the SQs in order to fetch the commands. The size of each command is 64-bytes. The host pointer fetching communicates with the arbitration module through the PRI2. The host pointer fetching for fetching PRPs or SGLs. The size of each pointer is 8-bytes for PRPs and 16-bytes for SGLs. The HMB read access communicates with the arbitration module through the PRI3. The HMB read access reads data from the HMB. The size and granularity depends on the implementation. The data transfer communicates with the arbitration module though the PRI4. The data transfer reads the data from the host. The granularity is 4 KB (multiple TLPs with burst size of 4 KB).

The arbitration module selects which operation of packets to send to the host. The selected operation packets are shown on the host side in the fetching order. The fetching order shows that the device does not receive a burst of TLPs. The size of each packet could be 512-bytes, but from the NVMe point of view sending a 4K packet is preferred. This means the address of those packets are incremented by 512-bytes. For example TLP1 and TLP2 are separated by a host pointer packet which is considered to be suboptimal.

Figure 5:
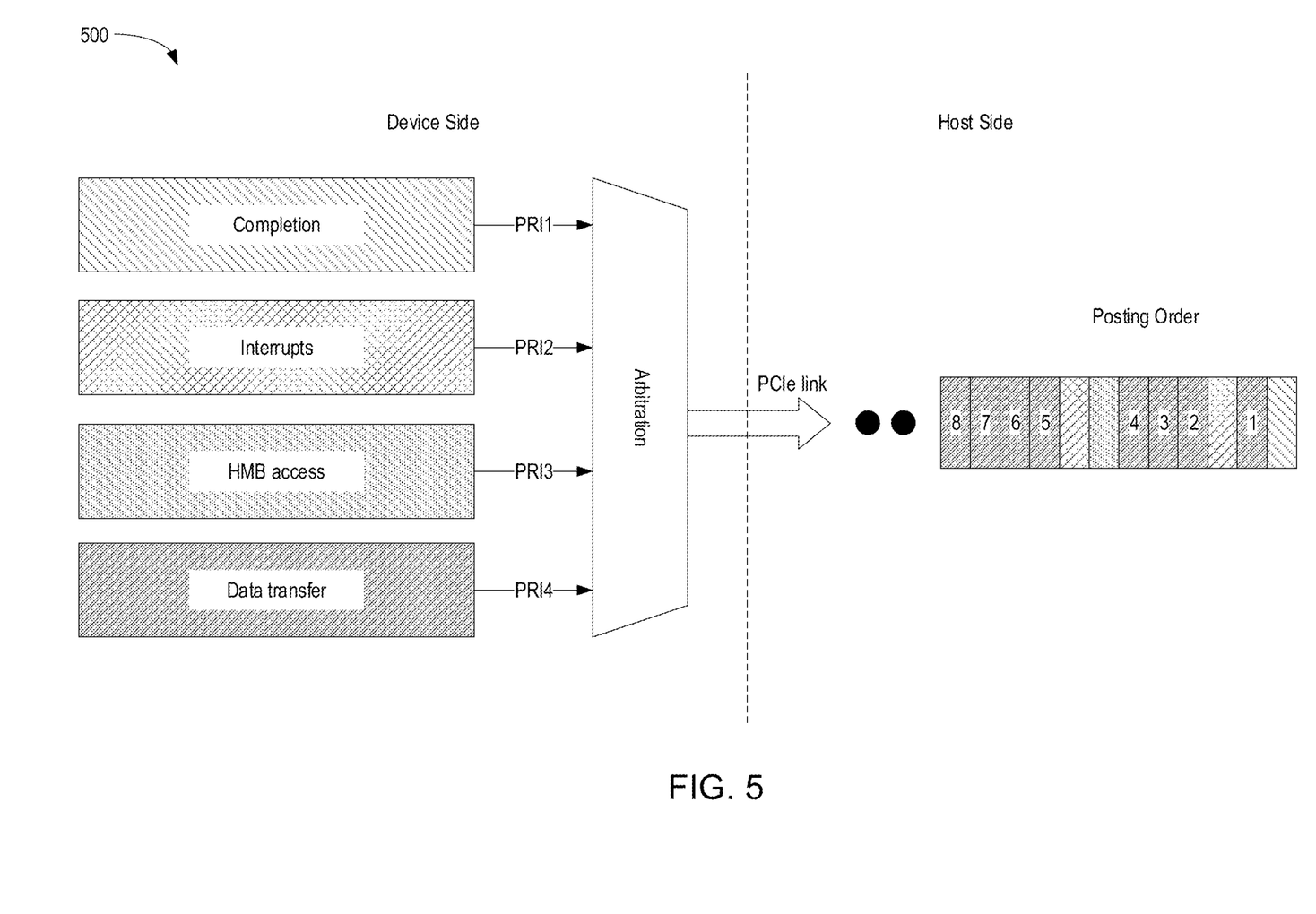
FIG. 5 is a schematic diagram illustrating a system for PCIe memory write transfer ordering, according to certain embodiments.

FIG. 5 is a schematic diagram illustrating a system 500 for PCIe memory write transfer ordering, according to certain embodiments. In the system 500 there are 8 TLPs in the data-transfer that creates one burst. The commands completion, interrupt postings, and HMB write access are interleaved within the burst. This behavior is allowed over PCIe interface, but is not ideal over the host DRAM interface. All the TLPs are targeted to host DRAM except of the interrupt which is directed to host CPU.

The system 500 comprises a device side and a host side. The host side comprises the 8 TLPs in the posting order. On the device side there is an arbitration module that communicates with the host side through a PCIe link. The completion module communicates with the arbitration module through the PRI1. The completion module sends notification to the host that a command is completed. The size of each command completion is 16-bytes. The interrupts posting communicates with the arbitration module through the PRI2. The size of each interrupt is 4-bytes, but the interrupts are directed to the CPU and no the host DRAM. The HMB write access communicates with the arbitration module through the PRI3. The HMB write access writes data to the HMB. The size and granularity depends on the implementation. The data transfer communicates with the arbitration module though the PRI4. The data transfer writes data to the host memory. The granularity is 4 KB (multiple TLPs with burst size of 4 KB).

The arbitration module selects which operation of packets to send to the host. The selected data packets are shown on the host side in the posting order. The posting order shows that the device does not send a burst of TLPs. The size of each packet could be 512-bytes, but from the NVMe point of view sending a 4K packet is preferred. This means the address of those packets are incremented by 512-bytes. For example TLP1 and TLP2 are separated by an interrupt packet which is considered to be suboptimal.

As will be discussed herein, the problem of PCIe transfer scheduling is improved while being efficient in order to maximize the performance over the host DRAM. The method is a burst aware method to maximize the efficiency and performance over the host DRAM. A smart scheduler is used in the SSD host interface. The scheduler considers the type of the transactions that are going to be sent over the interface and sends them in the most efficient way while maximizing the efficiency over the host DRAM. In one embodiment, the scheduler may be calibrated from time to time on the fly to find the optimal configurations adapted to the current workload.

Figure 6:
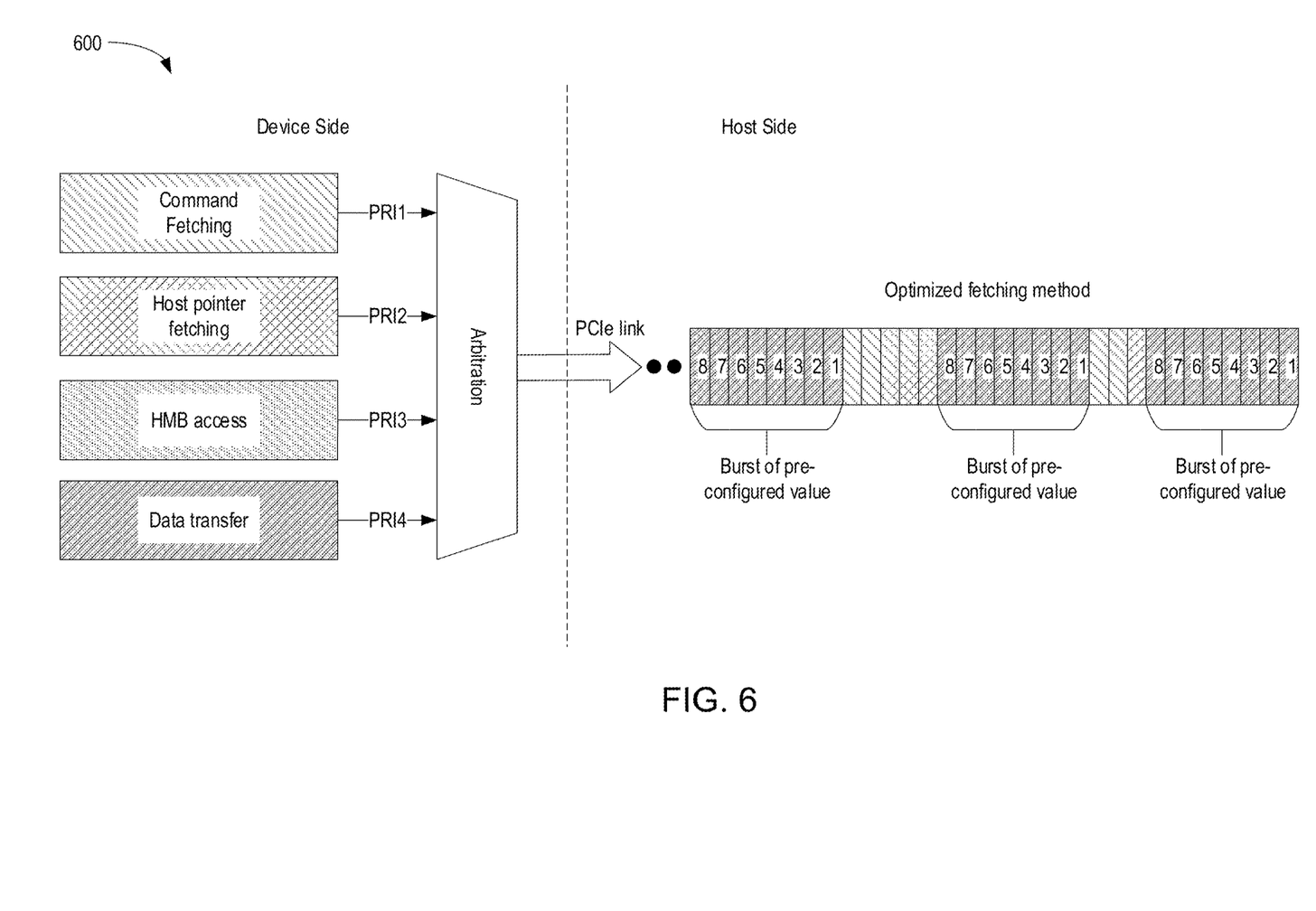
FIG. 6 is a schematic diagram illustrating a system for burst awareness in PCIe memory read transfers, according to certain embodiments.

FIG. 6 is a schematic diagram illustrating a system 600 for burst awareness in PCIe memory read transfers, according to certain embodiments. In the system 600 there are 8 TLPs in the data-transfer that create one burst. The command completion, the host pointer fetching, and the HMB read access are not interleaved within the burst. The packets are allowed to be sent only between the bursts.

The host side shows an optimized fetching order of a first burst of 8 TLPs, and then only then a scheduler will allow selecting of other packet types. For example the command fetching packet and then host pointer fetching is selected next by the arbitration module. If the arbitration module selects the next packet from the data transfer, the scheduler will make sure there is going to be a second burst of at least again 8 TLPs in order to optimize the performance over the bus. The system 600 shows a further example of the arbitration module selecting a different type of packet followed by the schedule selecting a third burst of 8 TLPs. The system 600 creates bursts for all data packet types, but the big advantage is in the data transfer.

Figure 7:
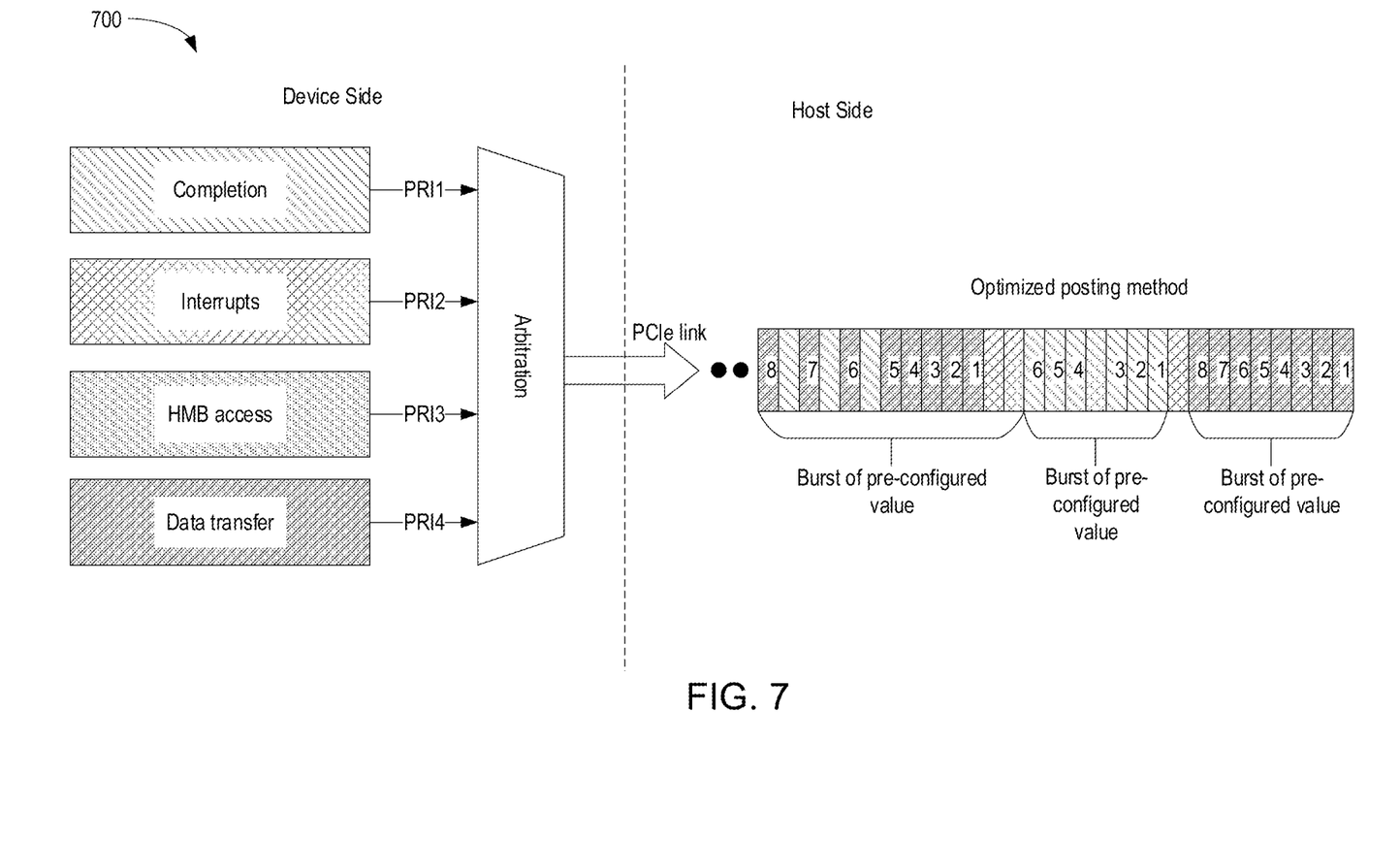
FIG. 7 is a schematic diagram illustrating a system for burst awareness in PCIe memory write transfers, according to certain embodiments.

FIG. 7 is a schematic diagram illustrating a system 700 for burst awareness in PCIe memory write transfers, according to certain embodiments. In the system 700 there are 8 TLPs in the data-transfer that create one burst. The command completions, the interrupt postings and the HMB write accesses are not interleaved within the burst. The packets are allowed to be sent only between the bursts. There are 8 TLPs in the data-transfer that create one burst and 6 TLPs in HMB transfers that create one burst. The system 700 is an example, but in reality there can be different values. The value of 8 or 6 is not fixed and can be changed per burst.

The host side shows an optimized posting order of a first burst of 8 TLPs, and then only then a scheduler will allow selecting of other packet types. For example the command fetching packet and then host pointer fetching is selected next by the arbitration module. If the arbitration module selects the next packet from the data transfer, the scheduler will make sure there is going to be a second burst. The HMB write access packets in sequential order is best. The system 600 creates bursts for all data packet types, but the big advantage is in the data transfer. The interrupt posting is a unique transfer since the destination target is not to the host DRAM but to the host CPU. Therefore, the packets may be transferred during a burst.

Figure 8:
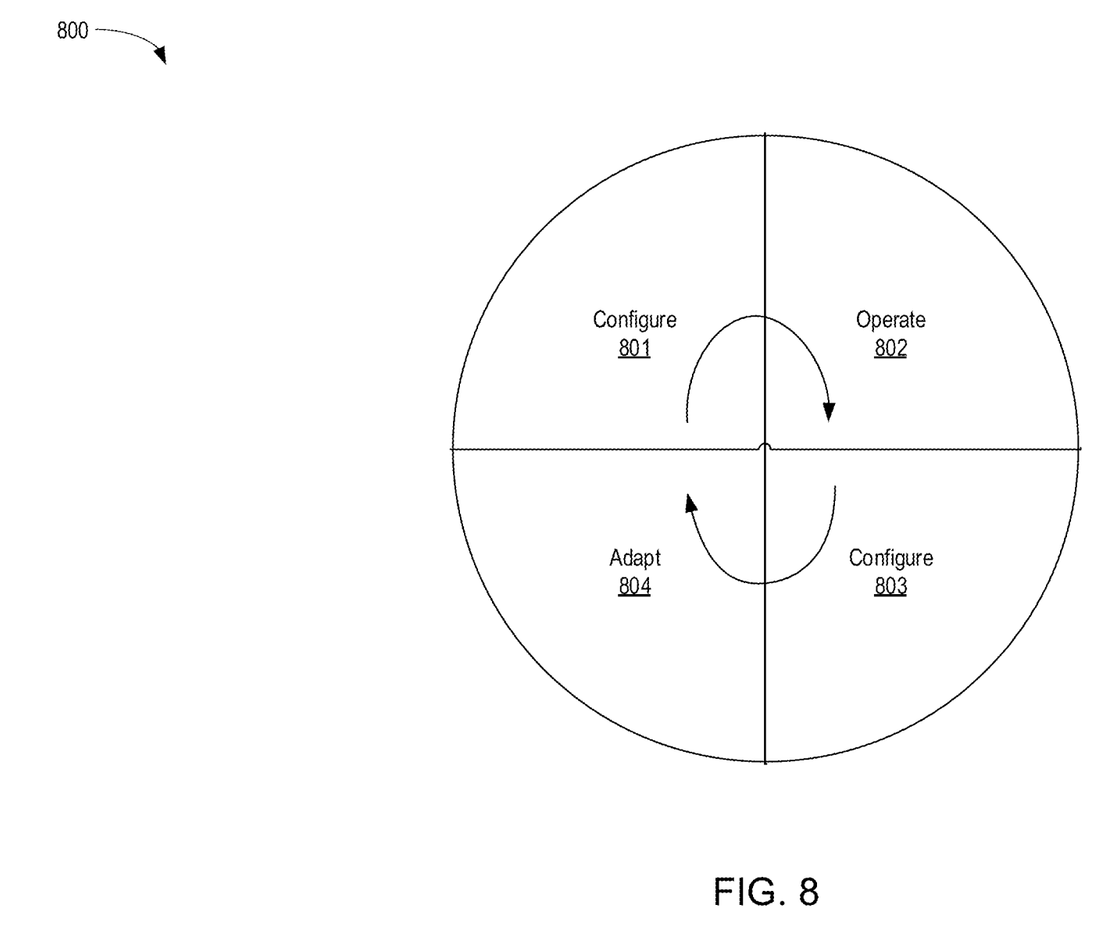
FIG. 8 is a flowchart illustrating a method for a burst calibration process, according to certain embodiments.

FIG. 8 is a flowchart illustrating a method 800 for a burst calibration process, according to certain embodiments. The method 800 is calibrated from time to time to find the optimal configurations. The arbitration module is configured with set of parameters for the arbitration bursts. The method 800 is activated while having transfers over the PCIe link. During this time, the performance is measured. The results are analyzed, and the configuration is adapted. The method 800 is repeated until finding the optimal configurations.

The method 800 begins a block 801. At block 801, the scheduler is reconfigured. Reconfiguring includes finding the best sixe for bursts. At block 802, the scheduler operates at the configuration determined in block 801. At block 803, the scheduler's performance is measured. At block 804, if the scheduler is sub optimized, then scheduler will adapt and the method 800 will return to block 801.

Figure 9:
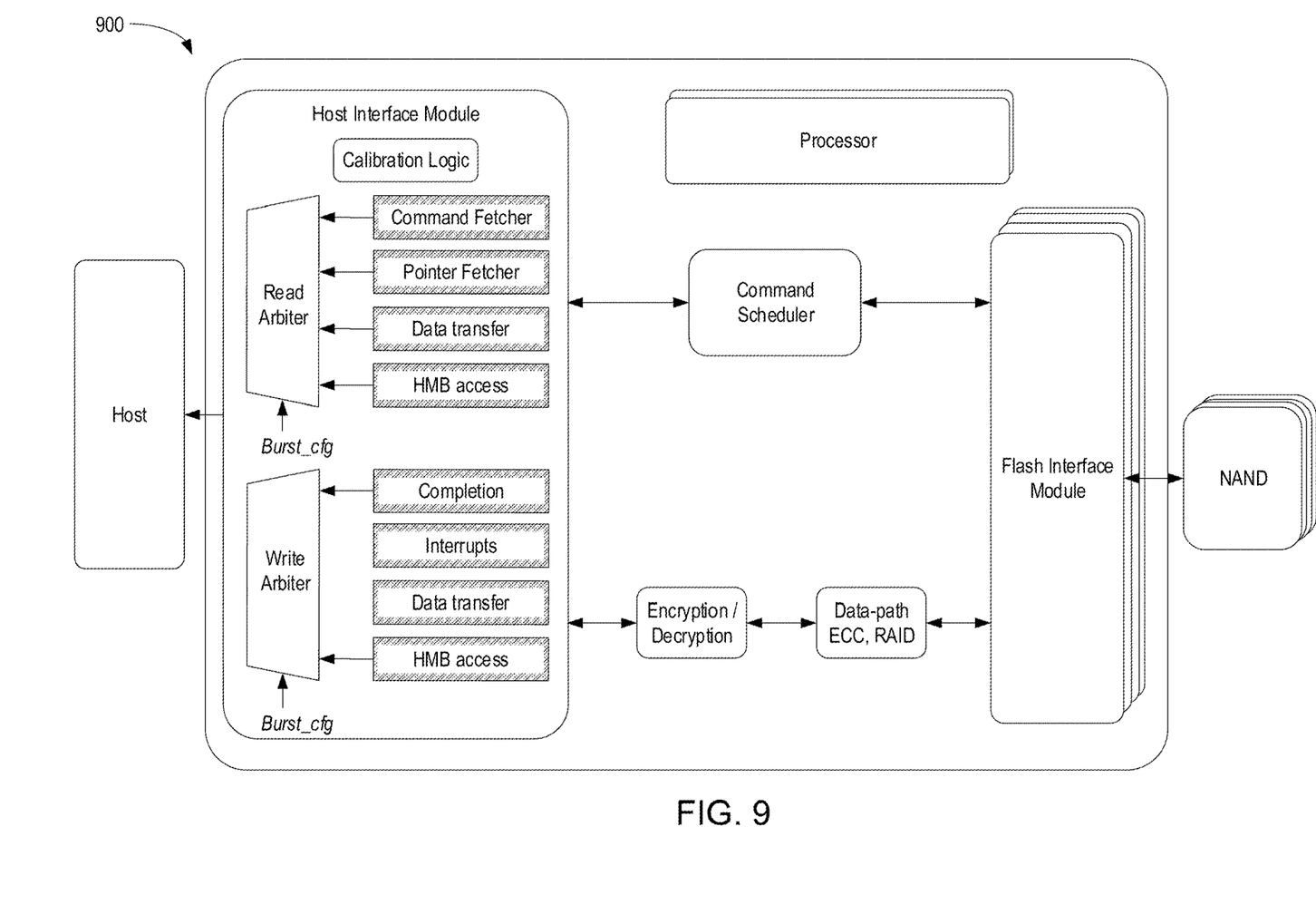
FIG. 9 is a schematic diagram illustrating a system implementing the burst awareness scheduler, according to certain embodiments.

FIG. 9 is a schematic diagram illustrating a system 900 implementing the burst awareness scheduler, according to certain embodiments. For each direction, the burst awareness arbiter is implemented. The arbiters consider the optimized burst length for each transfer type. Additionally, the calibration logic is responsible for calibrating the arbiters to maximize the overall performance.

The system 900 comprises a host, a device controller, and a plurality of NANDs. The Device controller comprises a host interface module (HIM), a processor, a command scheduler, an encryption/decryption module, a data-path error correction code (ECC), RAID module, and a plurality of flash interface modules (FIM). The HIM further comprises a calibration logic, a read arbiter, and a write arbiter. The read arbiter can read different packets such as the command fetcher, the pointer fetcher, the rata transfer, and the HMB read access module. The write arbiter can write different packets such as the command completion module, the interrupts posting module, the data transfer, and the HMB write access.

The calibration logic is responsible for calibrating the read arbiter and the write arbiter. The arbiters both have burst configuration. The burst configuration is responsible for configuring the arbiters correctly for maximum performance. The arbiters will take into account the best configuration in order to schedule the packets and send the packets to the host.

Figure 10:
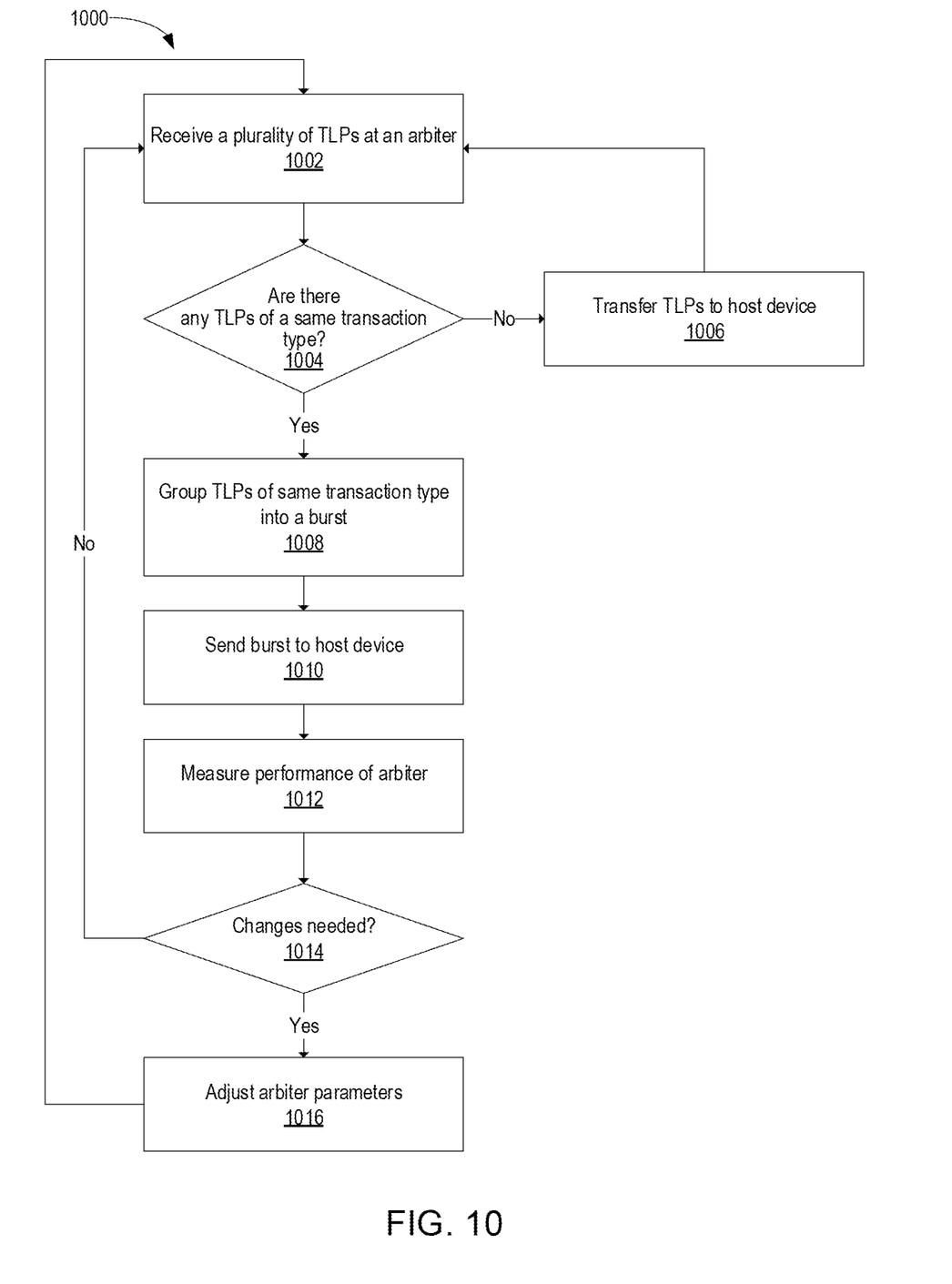
FIG. 10 is a flowchart illustrating a method for optimized burst scheduling of TLPs, according to certain embodiments.

FIG. 10 is a flowchart illustrating a method 1000 for optimized burst scheduling of TLPs, according to certain embodiments. The method 1000 begins at block 1002. At block 1002, the controller receives a plurality of TLPs at an arbiter. At block 1004, the controller determines whether there are any TLPs of a same transaction type. If the controller determines that there are no TLPs of the same transaction type, then the method 1000 proceeds to block 1006. At block 1006, the controller transfers TLPs to the host device. If the controller determines that there are TLPs of the same transaction type, then the method 1000 proceeds to block 1008. At block 1008, the controller groups TLPs of same transaction type into a burst. At block 1010, the controller sends burst to the host device. At block 1012, the measures performance of the arbiter. At block 1014, the controller determines whether there are any changes needed. If the controller determines changes are not needed, then the method 1000 returns to block 1002. If the controller determines that changes are needed, then the method 1000 proceeds to block 1016. At block 1016, the controller adjusts arbiter parameters and then the method 1000 returns to block 1002.

The main advantage of the command scheduler can be measured in performance and efficiency over host DRAM interface. The optimized command processing shows a method for burst friendly data-transfer which is more aligned with ideal DRAM transfers.

In one embodiment, a data storage device comprises: a memory device; and a controller coupled to the memory device, wherein the controller is configured to: determine a number of transaction layer packets (TLPs) that equal a burst; arrange the number of TLPs one after another to form the burst, wherein the number of TLPs are a same transaction type; and send the burst to a host device. The burst has a preconfigured value. The same transaction type is selected from the group consisting of: command fetching, host pointer fetching, host memory buffer (HMB) access, command completion posting, interrupt posting, and data transfer. The burst comprises data transfer TLPs. The burst additionally comprises interrupt posting. The controller is configured to group a second number of TLPs together to form a second burst, wherein the second burst comprises a mixture of transaction types that are different from the same transaction type. The determining is performed by a smart scheduler disposed in a host interface module (HIM). The HIM comprises a read arbiter and a write arbiter. The controller is configured to configure the read arbiter and the write arbiter with parameters for arbitration bursts. The controller is configured to dynamically adjust the determining. The controller is configured to adjust a size of the burst.

In another embodiment, a data storage device comprises: a memory device; and a controller coupled to the memory device, wherein the controller is configured to: receive a plurality of transaction layer packets (TLPs) at a host interface module (HIM), wherein the plurality of TLPs comprise one of more transaction types selected from the group consisting of: command fetching, host pointer fetching, host memory buffer (HMB) access, command completion posting, interrupt posting, and data transfer; arbitrate the plurality of TLPs; and send a burst of TLPs to a host device, wherein the burst comprises a plurality of TLPs of a first size and of a same transaction type. The controller is further configured to calibrate the arbitrating dynamically. The controller is configured to adjust the first size. The controller is configured to measure a performance of the arbitrating. The controller is configured to adjust the arbitrating in response to the measuring. The HIM includes a plurality of arbiters.

In another embodiment, a data storage device comprises: means to store data; and a controller coupled to the means to store data, wherein the controller is configured to: configure an arbitration burst setting in an arbiter; operate the arbiter according to the arbitration burst setting; measure performance of the arbiter using the arbitration burst setting; adapt the arbitration burst setting to a new arbitration burst setting; and repeat the configuring, operating, and measuring using the new arbitration burst setting instead of the arbitration burst setting. Operating the arbiter comprises sending transaction layer packets (TLPs) in a burst to a host device, wherein the burst comprises a number of TLPs of data transfer. The burst comprises one or more interrupts interspersed within the burst.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
determine a number of transaction layer packets (TLPs) that equal a burst;
arrange the number of TLPs one after another to form the burst, wherein the number of TLPs are a same transaction type; and
send the burst to a host device.

2. The data storage device of claim 1, wherein the burst has a preconfigured value.

3. The data storage device of claim 1, wherein the same transaction type is selected from the group consisting of: command fetching, host pointer fetching, host memory buffer (HMB) access, command completion posting, interrupt posting, and data transfer.

4. The data storage device of claim 3, wherein the burst comprises data transfer TLPs.

5. The data storage device of claim 4, wherein the burst additionally comprises interrupt posting.

6. The data storage device of claim 3, wherein the controller is configured to group a second number of TLPs together to form a second burst, wherein the second burst comprises a mixture of transaction types that are different from the same transaction type.

7. The data storage device of claim 1, wherein the determining is performed by a smart scheduler disposed in a host interface module (HIM).

8. The data storage device of claim 7, wherein the HIM comprises a read arbiter and a write arbiter.

9. The data storage device of claim 8, wherein the controller is configured to configure the read arbiter and the write arbiter with parameters for arbitration bursts.

10. The data storage device of claim 1, wherein the controller is configured to dynamically adjust the determining.

11. The data storage device of claim 1, wherein the controller is configured to adjust a size of the burst.

12. A data storage device, comprising:
a memory device; and
a controller coupled to the memory device, wherein the controller is configured to:
receive a plurality of transaction layer packets (TLPs) at a host interface module (HIM), wherein the plurality of TLPs comprise one of more transaction types selected from the group consisting of: command fetching, host pointer fetching, host memory buffer (HMB) access, command completion posting, interrupt posting, and data transfer;
arbitrate the plurality of TLPs; and
send a burst of TLPs to a host device, wherein the burst comprises a plurality of TLPs of a first size and of a same transaction type.

13. The data storage device of claim 12, wherein the controller is further configured to calibrate the arbitrating dynamically.

14. The data storage device of claim 12, wherein the controller is configured to adjust the first size.

15. The data storage device of claim 12, wherein the controller is configured to measure a performance of the arbitrating.

16. The data storage device of claim 15, wherein the controller is configured to adjust the arbitrating in response to the measuring.

17. The data storage device of claim 12, wherein the HIM includes a plurality of arbiters.

18. A data storage device, comprising:
means to store data; and
a controller coupled to the means to store data, wherein the controller is configured to:
configure an arbitration burst setting in an arbiter;
operate the arbiter according to the arbitration burst setting;
measure performance of the arbiter using the arbitration burst setting;

adapt the arbitration burst setting to a new arbitration burst setting; and repeat the configuring, operating, and measuring using the new arbitration burst setting instead of the arbitration burst setting.

19. The data storage device of claim 18, wherein operating the arbiter comprises sending transaction layer packets (TLPs) in a burst to a host device, wherein the burst comprises a number of TLPs of data transfer.

20. The data storage device of claim 19, wherein the burst comprises one or more interrupts interspersed within the burst.

* * * * *